(12) United States Patent
Alasti et al.

(10) Patent No.: US 12,335,771 B2
(45) Date of Patent: Jun. 17, 2025

(54) METHOD AND SYSTEM FOR AGGREGATE MAXIMUM BIT RATE (AMBR) MANAGEMENT

(71) Applicant: DISH Wireless L.L.C., Englewood, CO (US)

(72) Inventors: Mehdi Alasti, Reston, VA (US); Dhaval Mehta, Aldie, VA (US); Ashish Bansal, Frisco, TX (US); Siddhartha Chenumolu, Broadlands, VA (US)

(73) Assignee: DISH Wireless L.L.C., Englewood, CO (US)

( * ) Notice: Subject to any disclaimer, the term of this patent is extended or adjusted under 35 U.S.C. 154(b) by 251 days.

(21) Appl. No.: 17/444,004

(22) Filed: Jul. 29, 2021

(65) Prior Publication Data
US 2023/0033532 A1    Feb. 2, 2023

(51) Int. Cl.
*H04W 28/02* (2009.01)
*G06N 20/00* (2019.01)
(Continued)

(52) U.S. Cl.
CPC ........ *H04W 28/0257* (2013.01); *G06N 20/00* (2019.01); *H04W 28/0268* (2013.01);
(Continued)

(58) Field of Classification Search
CPC ......... H04W 28/0257; H04W 28/0268; H04W 28/06; H04W 28/18; H04W 72/121; H04W 72/566; G06N 20/00
See application file for complete search history.

(56) References Cited

U.S. PATENT DOCUMENTS 7,738,375 B1 * 6/2010 Vinokour ............ H04L 47/2441
370/468
9,107,228 B2    8/2015 Pitakdumrongkija et al.
(Continued)

FOREIGN PATENT DOCUMENTS

EP    3579613 A1    12/2019

OTHER PUBLICATIONS

Subramanian, R., et al. "Benchmarking of Cell Throughput Using Proportional Fair Scheduler in a Single Cell Environment", International Journal of Wireless & Mobile Networks, Apr. 2015, pp. 67-79, vol. 7, No. 2.
(Continued)

*Primary Examiner* — Gary Mui
*Assistant Examiner* — Yewon Kim
(74) *Attorney, Agent, or Firm* — KW Law, LLP

(57) ABSTRACT

Systems and methods of scheduling bit rates for first-class traffic for a first and second class session for a device; honoring for the device each first class session with the bit rate equal to a session aggregate maximum bit rate (AMBR) by a scheduler by assigning a threshold for an aggregate bit rate for traffic for each first-class session; if a total of the aggregate bit rate of traffic for each first class session is below the threshold assigned, then assigning each first class session the session AMBR for first-class session traffic for the device; if the total of the aggregate bit rate of traffic for each first class session is above the threshold assigned, then proportionality scheduling packets of the traffic for the first class session of the device to limit the aggregate rate of the first-class traffic below the threshold.

18 Claims, 5 Drawing Sheets

(51) Int. Cl.
  *H04W 28/06* (2009.01)
  *H04W 28/18* (2009.01)
  *H04W 72/121* (2023.01)
  *H04W 72/566* (2023.01)

(52) U.S. Cl.
  CPC .......... *H04W 28/06* (2013.01); *H04W 28/18* (2013.01); *H04W 72/121* (2013.01); *H04W 72/566* (2023.01)

(56) References Cited

U.S. PATENT DOCUMENTS

| | | | | |
|---|---|---|---|---|
| 2008/0074996 | A1* | 3/2008 | Fourcand | H04L 1/0086 370/464 |
| 2010/0135229 | A1* | 6/2010 | Lohr | H04W 72/21 370/329 |
| 2011/0044262 | A1* | 2/2011 | Satapathy | H04W 28/0268 370/329 |
| 2013/0272121 | A1* | 10/2013 | Stanwood | H04L 47/805 370/230 |
| 2015/0009826 | A1* | 1/2015 | Ma | H04W 28/0289 370/235 |
| 2016/0135076 | A1* | 5/2016 | Grinshpun | H04W 28/0284 370/252 |
| 2017/0318595 | A1 | 11/2017 | Dinan et al. | |
| 2018/0249373 | A1* | 8/2018 | Castro Castro | H04W 24/08 |
| 2020/0015117 | A1 | 1/2020 | Wu | |
| 2020/0221468 | A1 | 7/2020 | Babaei et al. | |
| 2021/0258969 | A1* | 8/2021 | Yang | H04W 72/54 |
| 2021/0368395 | A1* | 11/2021 | Prabhakar | H04W 28/24 |

OTHER PUBLICATIONS

PCT International Search Report for International Application No. PCT/US2022/038540 dated Oct. 24, 2022 (4 pages).

Written Opinion of the International Searching Committee for International Application No. PCT/US2022/038540 dated Oct. 24, 2022 (5 pages).

* cited by examiner

METHOD AND SYSTEM FOR AGGREGATE MAXIMUM BIT RATE (AMBR) MANAGEMENT

TECHNICAL FIELD

The following discussion generally relates to wireless communications systems. More particularly, the following discussion relates to systems and processes to manage Aggregate Maximum Bit Rate (AMBR) traffic for a set of goals for User Equipment (UE) associated with a subscriber with multiple sessions of network traffic.

BACKGROUND

The 5G network is the fifth generation technology standard for broadband cellular networks, which cellular phone companies began deploying worldwide recently, and is the planned successor to the 4G networks to provide connectivity. The 5G data standard and telephone networks were developed to provide greatly improved bandwidth and quality of service to mobile telephones, computers, internet-of-things (IoT) devices, and the like.

In the 5G network, the Quality of Service (QoS) can be provided differently for different prioritized levels of network traffic between subscribers and services. For example, premium subscribers can be given a higher priority for certain services over non-premium subscribers. As the traffic in a network increases, the allocation of resources is an issue between premium and non-premium subscribers which requires managing or apportioning traffic based on available bandwidth for performance to upgrade or degrade services that are offered at different priority levels.

Network traffic is configured with certain constraints that must be considered when scheduling session traffic of multiple priority levels. For example, more stringent QoS/QoE requirements may be required for higher quality video as well as different latency requirements than other services deemed less important. Hence, scheduling must consider trade-offs between fairness, overall system throughput, QoS requirements, and also use semi-persistent strategies to improve resource allocation, especially in the case of video traffic.

It is desired to provide solutions to manage multiple session traffic by treating higher priority traffic with fairness and quality of service by managing the multi-class session traffic by an intelligent model and honoring the user equipment aggregate maximum bit rate (UE-AMBR) for a subscriber.

Furthermore, other desirable features and characteristics of the present invention will become apparent from the subsequent detailed description and the appended claims, taken in conjunction with the accompanying drawings and the foregoing technical field and background.

DESCRIPTION OF THE DRAWINGS

The exemplary embodiments will hereinafter be described in conjunction with the following drawing figures, wherein like numerals denote like elements, and wherein.

BRIEF SUMMARY

Figure 1:
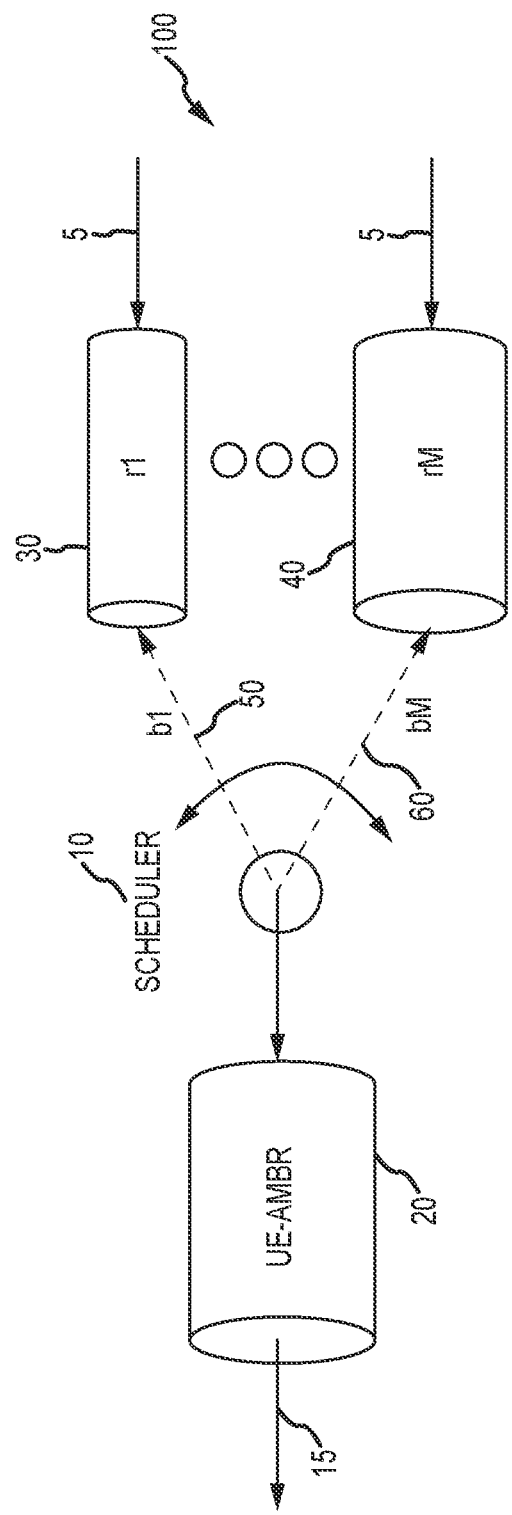
FIG. 1 illustrates an exemplary diagram of components of a scheduler with considerations for traffic flow by the session management system in a wireless data networking environment in accordance with various embodiments.

Systems and processes are provided to manage traffic flow with multiple prioritized levels of session traffic to deliver optimal quality of service for a subscriber or device based on various allocations and fairness apportioned between the multiple classes of session traffic.

In an exemplary embodiment, a method of scheduling bit rates for multi-class session traffic of a device is provided. The method includes defining by a scheduler a bit rate for first class traffic for a first class session, and for second class traffic for a second class session of a set of multiple first and second class sessions configured for the device; honoring, by the scheduler, for the device for each first class session, the bit rate equal to a session aggregate maximum bit rate (AMBR); assigning, by the scheduler, a threshold for an aggregate bit rate for traffic for each first class session of the device; if a total of the aggregate bit rate of traffic for each first class session for the device is below the threshold assigned, then assigning by the scheduler for each first class session the session AMBR for first class session traffic for the device without proportionality scheduling of session traffic for each first class session; if the total of the aggregate bit rate of traffic for each first class session for the device is above the threshold assigned, then proportionality scheduling, by the scheduler, packets of the traffic for each first class session of the device to limit the aggregate rate of the first class traffic of the device below the threshold wherein the proportionality scheduling of the packets of the first class traffic guarantees quality of experience amongst the session traffic of each first class session of the device, and refrains starvation of each session of second class traffic of the device; and preventing, by the scheduler, starvation of each second class session for the device, by not allocating bandwidth for each first-class session that is above the assigned threshold of the aggregate bit rate for traffic for each first class session for the device.

In at least one embodiment, the proportional share of bit rates for the traffic of the first class session is enforced when the aggregate traffic of the first-class traffic for each session exceeds the threshold and is not enforced when the aggregated traffic of the first-class traffic for each session does not exceed the threshold.

In at least one embodiment, the method includes scheduling including a proportional share allocated to each first class session that includes a set of attributes ascribed to each first class session of traffic that includes quality of experience for each share of the bit rate of each first class session that makes up the total number of first-class sessions.

In at least one embodiment, the method includes allocating, by the scheduler, fairness apportioned for each share of first-class traffic to ensure the equal or identical quality of experience between each first class session.

In at least one embodiment, the method includes if the total of the aggregate bit rate of traffic for each first-class session for the device is above the threshold assigned, then proportionality reducing, by the scheduler, the same percentage or proportional share of bit rates of each first class session traffic so that the sum of all first-class session bit rates for the device maintains fairness proportioned for a share of bit rates in each first class session and each first class session is provided with the same quality of experience for the device wherein the proportionality reducing of each proportional share in each first class session still guarantees a minimum bandwidth for the second class traffic if required to avoid starvation.

In at least one embodiment, the method includes defining, by the scheduler, the bit rate for the second class session that has a priority less than the bit rate of the first class session and includes a residual amount of available bit rate composed of any unused bit rate by the first class session, wherein the bit rate of each second class session is equally proportioned for fairness but not for the quality of experience wherein the bit rate for each second class session is further not compromised by a guarantee of a minimum bandwidth to avoid starvation of second class traffic in each second class session.

In another exemplary embodiment, a system for scheduling bit rates for multi-class session traffic in a network is provided. The system includes a scheduler unit; a control unit; wherein the control unit receives an input of measurements from user equipment, and input from measurements of a series of tunnels of a set of bearers, and implement an intelligent application to configure the scheduler unit to: define a bit rate for first class traffic for a first class session, and for second class traffic for a second class session of a set of multiple first and second class sessions configured for the device from the network; honor for the device for each first class session, the bit rate equal to a session aggregate maximum bit rate (AMBR); assign a threshold for an aggregate bit rate for traffic for each first class session of the device; if a total of the aggregate bit rate of traffic for each first class session for the device is below the threshold assigned, then assign for each first class session the session AMBR for first class session traffic for the device without proportionality scheduling of session traffic for each first class session; if the total of the aggregate bit rate of traffic for each first class session for the device is above the threshold assigned, then proportionality schedule packets of the traffic for each first class session of the device to limit the aggregate rate of the first class traffic of the device below the threshold wherein the proportionality schedule of the packets of the first class traffic guarantees quality of experience amongst the session traffic of each first class session of the device, and refrains starvation of each session of second class traffic of the device; and prevent starvation of each second class session for the device, by not allocating bandwidth for each first-class session that is above the assigned threshold of the aggregate bit rate for traffic for each first class session for the device.

In at least one exemplary embodiment, the proportional share of bit rates for the traffic of the first class session is enforced when the aggregate traffic of the first-class traffic for each session exceeds the threshold and is not enforced when the aggregated traffic of the first-class traffic for each session does not exceed the threshold.

In at least one exemplary embodiment, the schedule includes a proportional share allocated to each first class session that includes a set of attributes ascribed to each first class session of traffic that includes quality of experience for each share of the bit rate of each first class session that makes up the total number of first-class sessions.

In at least one exemplary embodiment, the system includes the scheduler configured to: allocate fairness apportioned for each share of first-class traffic to ensure the equal or identical quality of experience between each first class session.

In at least one exemplary embodiment, the system includes the scheduler configured to if the total of the aggregate bit rate of traffic for each first-class session for the device is above the threshold assigned, then proportionality reduce the same percentage or proportional share of bit rates of each first class session traffic so that the sum of all first-class session bit rates for the device maintains fairness proportioned for a share of bit rates in each first class session and each first class session is provided with the same quality of experience for the device wherein the proportionality reduction of each proportional share in each first class session still guarantees a minimum bandwidth for the second class traffic if required to avoid starvation.

In at least one exemplary embodiment, the system includes the scheduler unit configured to define the bit rate for the second class session that has a priority less than the bit rate of the first class session and includes a residual amount of available bit rate composed of any unused bit rate by the first class session, wherein the bit rate of each second class session is equally proportioned for fairness but not for the quality of experience wherein the bit rate for each second class session is further not compromised by a guarantee of a minimum bandwidth to avoid starvation of second class traffic in each second class session.

In at least one exemplary embodiment, the first class session, and the second class session are prioritized in accordance with a network identifier that classifies a data type of the first and second class sessions.

In at least one exemplary embodiment, the scheduler unit configured to: treat the first class session with a high priority than the second class traffic, and also treated with an attribute of fairness amongst each of the first-class sessions.

In yet another exemplary embodiment, a method of providing service assurance for session management is provided. The method includes defining, by a service assurance module, a bit rate for first class traffic for a first class session, and for second class traffic for a second class session of a set of multiple first and second class sessions configured for the device; honoring by the service assurance module, for each device for each first class session, the bit rate equal to a session aggregate maximum bit rate (AMBR); assigning, by the service assurance module, a threshold for an aggregate bit rate for traffic for each first class session of the device to ensure an optimal quality of experience between each first class session; if a total of the aggregate bit rate of traffic for each first class session for the device is below the threshold assigned, then assigning by the service assurance module for each first class session a determined bit rate for first class session traffic for the device without proportionality scheduling of session traffic for each first class session; if the total of the aggregate bit rate of traffic for each first class session for the device is above the threshold assigned, then proportionality scheduling, by the service assurance module, packets of the traffic for the first class session of the device in a manner to limit the aggregate rate of the first class traffic of the device below the threshold wherein the proportionality scheduling of the packets of the first class traffic guarantees an optimal quality of experience amongst the session traffic of first class sessions of the device, and refrains starvation of each session of second class traffic of the device; and preventing, by the service assurance module, starvation of each second class session for the device, by not allocating bandwidth for each first-class session that is above the assigned threshold of the aggregate bit rate for traffic for each first class session for the device.

In at least one exemplary embodiment, the first class session, and the second class session are prioritized in accordance with a network identifier that classifies a data type of the first and second class sessions.

In at least one exemplary embodiment, the method includes treating, based on the AI model implemented by the service assurance module, the first class session with the high priority than the second class traffic, and also treating based on an attribute for the first class session, the quality of experience amongst each of the first-class sessions.

In at least one exemplary embodiment, the method includes preventing starvation based on the AI model implemented by the assurance service module of each second class session for the device by not allocating bandwidth for the first-class sessions that are above a certain level or a specified percentage determined by the assurance service module.

In at least one exemplary embodiment, the method includes if the aggregate first class session traffic for the device is beyond the certain level or a specified percentage of the bandwidth of the AMBR of the UE, then either dynamically adjusting the certain level or specified percentage of the first class session traffic, by the assurance module, or allocating proportionally, based on the AI model implemented by the service assurance module, a certain percentage of the bandwidth of the AMBR allotted at the UE to the AMBR allotted at the APN from amongst all the first-class sessions for the subscriber.

In at least one exemplary embodiment, the AI model is configured to dynamically adjust the percentage of the bit rate for each device independent of each other, and further dependent on a network load, deliver optimal quality of experience based at least on a device's profile and service received.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Wireless mobile communication technology uses various standards and protocols to transmit data between a base transceiver station (BTS) and a wireless mobile device. In 3GPP radio access networks (RANs) in LTE systems, the BTS can be a combination of evolved Node Bs (also commonly denoted as enhanced Node Bs, eNodeB s, or eNB s) and Radio Network Controllers (RNCs) in a Universal Terrestrial Radio Access Network (UTRAN), which communicates with the wireless mobile device, known as user equipment (UE). A downlink (DL) transmission can be a communication from the BTS (or eNodeB) to the wireless mobile device (or UE), and an uplink (UL) transmission can be a communication from the wireless mobile device to the BTS.

In a 5G network, traffic classes differentiate the subscriber traffic and are associated with a maximum bit rate and a guaranteed bit rate, which can be configured independently for uplink and downlink subscriber traffic. To process the traffic for bearer requests received at the broadband gateway or APN, each traffic class is classified and mapped in accordance with a configured profile of the designated QoS classifier.

According to the 3GPP specifications, however, as long as a GBR (guaranteed bit rate) bearer is admitted, the eNB has to allocate resource blocks (RBs) for the bearer to ensure its transmission right. At the same time, eNB also must distribute the remaining RBs to non-GBR bearers to achieve high radio resource utilization.

The 5G system architecture is provided with flexibility within limits for scheduling by the multiple Session and Service Continuity (SSC) modes. Once an SSC mode is associated with a PDU Session then it does not change during the lifetime of the PDU Session. The 5G architecture allows applications to configure the selection of SSC modes as needed for required data service.

The 5G network consists of the wireless radio access network (RAN), which includes the User Equipment (UE) and the Base Station/g-NodeB (gNB), and the wired packet core network. In the control plane of the 5G core, the Access, and Mobility Function (AMF) is associated with registration and mobility management, and the Session Management Function (SMF) manages the UE's data sessions. The data plane includes one or more User Plane Functions (UPFs) that forward user data through the packet core. The control and data plane components communicate using Packet Forwarding Control Protocol (PFCP) messages that are exchanged between the SMF and UPF over User Datagram Protocol (UDP).

The amount of traffic flowing through the 5GS for a UE is limited by the subscription for non-GBR traffic or what a subscriber is allowed, which corresponds to the AMBR and the UE-AMBR. The guaranteed flow bit rate (GFBR) that includes the uplink (UL) and downlink (DL) is negotiated at the establishment of a policy for the GBR QoS flow. Each PDU session is associated with a Session AMBR. The Session-AMBR limits the aggregate bit that can be expected to be provided across all the non-GBR QoS flows for a specific PDU session. The subscribed session-AMBR is a subscription parameter that is retrieved by the SMF from the Unified Data Management (UDM). The SMF may use the subscribed Session-AMBR or modify it based on local policies or use the authorized Session-AMBR received from PCF to determine the Session-AMBR to be applied to the PDU session. The Session-AMBR to be applied to the PUD session is signaled to the appropriate UPFs to the UE. The UE-AMBR limits the aggregate bit rate that can be expected to be provided across all non-Guarantee Bit Rate (GBR) subscribers of a UE. Each of those non-GBR subscribers could potentially utilize the entire UE-AMBR, e.g., when the other non-GBR subscribers do not carry any traffic.

The UE-AMBR limits the aggregate bit rate based on a non-GBR (non-Guaranteed Bit Rate) and monitors the parameter in directions for uplink and downlink. This can include the non-GBR of the minimum GBR for EPS bearer, the MBR of the maximum GBR for EPS bearer, and the Non-GBR bearer does not provide guaranteed bandwidth and also monitors two parameters in directions uplink and downlink of the AMBR—general maximum speed permitted for the entire non-GBR throughput for specific APN (Access Point Name) and UE-AMBR-overall maximum speed permitted for the entire non-GBR throughput for all of APN that can be expected to be provided across all non-Guarantee Bit Rate (GBR) bearers of a UE.

The 3GPP specification for QoS defines the Aggregate Maximum Bit Rate (AMBR) for the Access Point Name (APN) or gateway access as the APN-AMBR in which non-guaranteed sessions (non-GBR) are APN-AMBR and UE-AMBR. The two parameters for each APN-AMBR and UE-AMBR that are used for both DL and UL traffic (for example, the parameters for UE-AMBR DL/UL are DL UE-AMBR and UL UE-AMBR). For a session, the APN-AMBR is the aggregate maximum bit rate of a session, and the UE-AMBR is the aggregate maximum bit rate of a UE. The UE can have multiple non-GBR sessions (APNs) with (up to 5) quality identifiers (QI)s for each represented 5G flow and more than 55QIs can be assigned to a UE in each direction.

The QCI is a scalar associated with a bearer and is used to define the type of traffic and service expected in the bearer. For example, the service classes can include conversational, streaming, interactive, and background. The different sessions can be configured with a different 3GPP 5QI of the 5G QoS (quality of service) identifier. The network limits the rate of each non-GBR session to less than its associated APN-AMBR, and the total rate of a UE should not be more than its associated UE-AMBR. If the aggregate rate of non-GBR sessions exceeds UE-AMBR, the network should limit the rate of sessions to meet the UE-AMBR threshold.

The GBR traffic can be considered traffic that guarantees no congestion-related packet drops will occur under any system load, provided that the offered traffic remains within its GBR envelope. Interactive voice and video are currently the two main services using GBR bearers. Because voice service has a low data rate, and the number of voice flows is much smaller than best-effort traffic (e.g., web browsing, Over-the-top (OTT) non-real-time video services), mobile networks can support GBR bearers for voice calls. In contrast, real-time video service requires a higher data rate in comparison to voice services. Real-time video flows, in particular, may have high maximum bit rates, compared to the averaged rate, and they require the system to accommodate the maximum bit rate at the moment it is required, to maintain the real-time service.

In an exemplary embodiment, during real-time video sessions, the required bit rate may be dynamically estimated by monitoring the QoE feedback parameters. The service assurance/near RT RIC can be configured to implement an AI model to estimate the effective rate and control the scheduler. The bit rate can be adjusted to achieve a QoE target level defined by mobile network operators. For example, if the QoE level of a user application is above a threshold, the bit rate can be reduced to improve resource utilization. If the QoE level is dropped below another threshold, the bit rate can be adjusted and increased.

In an exemplary embodiment, each session (first class or second class) is assigned a session AMBR. A session bit rate cannot go beyond its session AMBR. Also, the scheduler assigns a threshold for aggregate of the first class traffic for a device. If the total aggregate bit rate of the first class traffic of the device is below the threshold, then the scheduler assigns the session AMBR to each session of the device. In this case, there is no need for proportionality. Else, if the total aggregate bit rate of the first class traffic of the device is beyond the threshold, then the scheduler proportionally schedules the packets of the first class traffic of the device to limit the aggregate rate of the first class traffic of the device below the threshold. The proportionality guarantees fairness among the first class sessions of the device and refrains starvation of the second class traffic.

FIG. 1 shows a diagram of a graphical representation of a scheduler implemented in a 5G network managing the user equipment allotted aggregate maximum bit rate (UE-AMBR) of an exemplary configuration of the session management system in accordance with various exemplary embodiments. In FIG. 1, the traffic 5 (e.g., non-GBR bearer provided) is configured in multiple rate sessions where the UE uses an identifier "$_M$" for non-GBR sessions: 1 to M. The rate of the non-GBR sessions is represented by: "$r_1$" 30, to "$r_M$" 40. For more optimal management of the session traffic, the aggregate maximum bit rate of the UE should be less than the sum of the APNs aggregate bit rates if the sum of the rates of each (Non-GBR) session (session in which the bit rate is not guaranteed) is less than or equal to the device or UE total AMBR, UE-AMBR 20. This is shown in the functional equation described as follows: UE-AMBR<= (APN-AMBR$_1$+ . . . +APN-AMBR$_M$) If $r_1$+ . . . +$r_M$<=UE-AMBR 20.

In this instance, the network is constrained and enforces a policy or fairness for each session bit rate for APN-AMBRs where ($r_1$<=APN-AMBR$_1$, . . . , $r_M$<=APN-AMBR$_M$) and since the UE-AMBR threshold is deemed sufficient, otherwise if $r_1$+ . . . +$r_M$>UE-AMBR 20, then, the share of each session (e.g., output 15) in the aggregate traffic should be appropriately configured at gNB by a scheduler 10 to meet the UE-AMBR 20 threshold. The scheduler 10 apportions each session traffic (e.g., output 15) by considering the factors of the quality of experience that is supported in each session, the fairness constraints are configured or supported amongst the sessions, and this prevents any session for the subscriber to experience starvation as there is allotted a minimum threshold is required amongst all the sessions.

Figure 2:
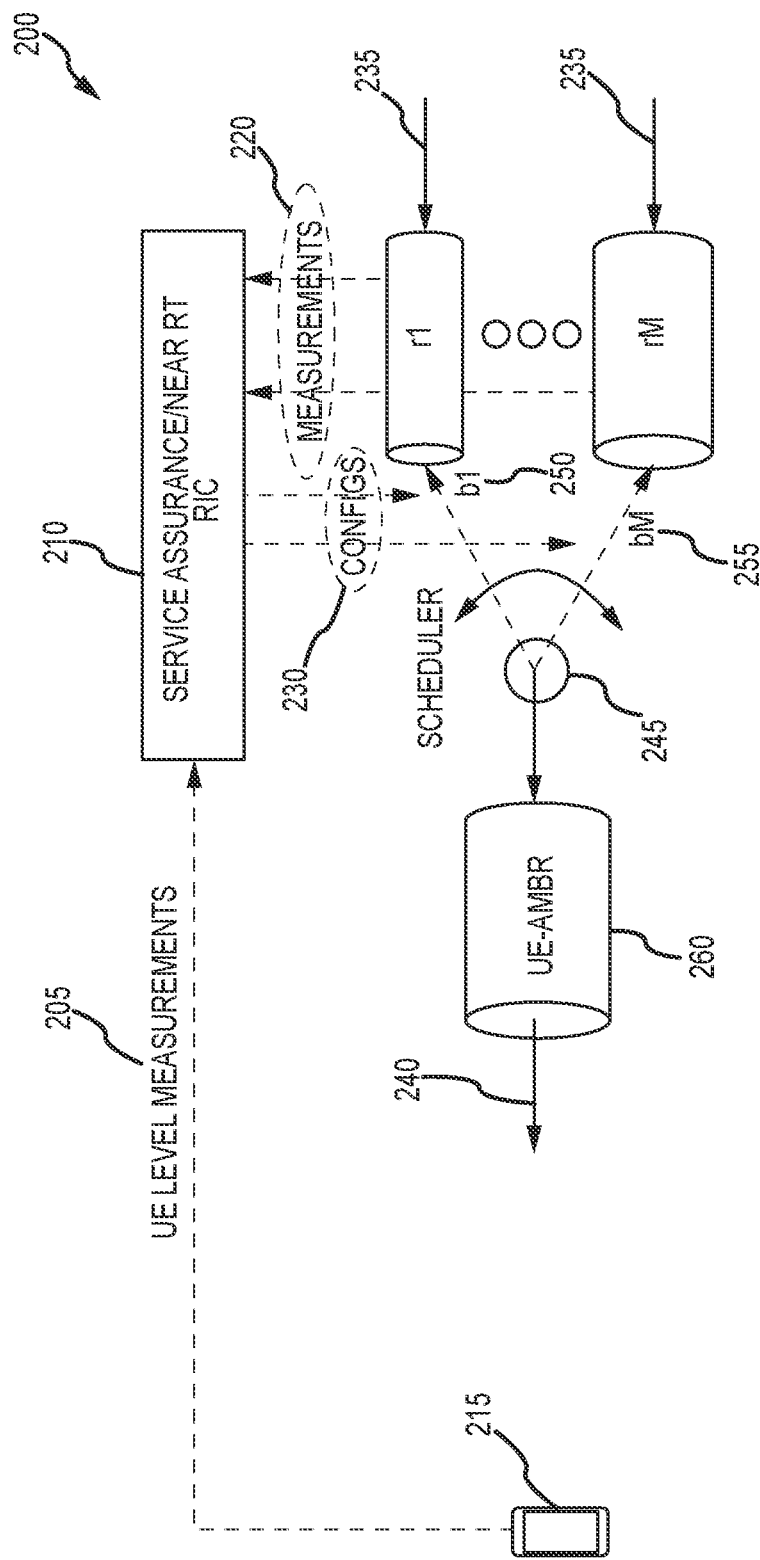
FIG. 2 illustrates an exemplary diagram of a feedback communication loop that receives measurements for service assurance for scheduling weights to optimize the quality of service for traffic flow by the session management system in a wireless data networking environment in accordance with various embodiments.

FIG. 2 illustrates an exemplary diagram of a feedback communication loop that receives measurements for service assurance for scheduling weights to optimize the quality of service for traffic flow by the session management system in a wireless data networking environment in accordance with various embodiments. In FIG. 2, the scheduler 245 for the session management system 200 for a device 215 sends UE level measurements 205 to the service assurance/Near RT RIC 210 module that receives input of a set of measurements 220 from multiple bit rates flows $r_1$ to $r_m$ (e.g., provided by data bearers) that make up the PDU session, and from input of the UE level measurements 205. The service assurance/Near RT RIC 210 configures (i.e., adjusts the throughput) of the set of bit-rates $b_1$ to $b_m$ tunneled to scheduler 245 for the UE-AMBR 260 and output 240 for the APN session.

In an exemplary embodiment, the first "K" sessions (of the APN sessions) are configured to carry higher priority non-GBR traffic that includes video, voice, MC-PTT, MC-data, etc where the value of K is less than or equal to M (i.e., K<=M). This set of higher priority traffic is defined as a set of class 1 sessions (i.e., higher priority traffic sessions) and the other sessions of non-GBR are defined as Class 2 sessions (i.e., lower priority traffic sessions).

In an exemplary embodiment, the Class 1 and Class 2 sessions are identified by the network identifier of 5QIs or a particular DSCP marking. The 5QI is considered the preferred metric and traffic identifier.

In an exemplary embodiment, the Quality of Experience (QoE) for the traffic in the Class 1 sessions because of the designation by the scheduler 245 with higher priority, each of the class 1 sessions is configured with fairness attributes to ensure an equal QoE amongst each session. Also, the allotment by scheduler 245 prevents the lower prioritized sessions or Class 2 sessions to encounter any starvation in allocation, by maintaining a minimum bit rate. Therefore, the aggregate bit rates for all the Class 1 sessions cannot be allocated more than a certain level or specific percentage of UE-AMBR. This specific percentage "a" of the UE bandwidth corresponds to an "a*UE-AMBR" of a percentage of the total UE aggregated bit rate (UE-AMBR).

In an exemplary embodiment, to enable this allocation, the scheduler 245 configures weights for each Class (i.e., Class 1 and Class 2) session as follows: For Class 1 sessions, if the aggregate traffic of Class 1 sessions is lower than "a*UE-AMBR", the scheduler honors the sessions with the configured a bit-rate of the amount allotted by the access point network or total available aggregate maximum bit rate (APN-AMBR). Otherwise, if the aggregate traffic of a Class 1 session is beyond the threshold (i.e., "a*UE-AMBR"), then the "a*UE-AMBR" or UE bandwidth will be allocated proportionally by the scheduler 245 for an equal distribution of the allotted bit-rate by the access point network. This is allotted bit-rate an equal apportioned amount of the aggregated maximum bit rate or "APN-AMBR" for each Class 1 session scheduled.

In an exemplary embodiment, for the Class 2 sessions, the scheduler 245 (i.e., as configured by the service assurance/near RT RIC 210) allocates the remaining bandwidth fairly amongst the Class 2 sessions available. For example, the Class 1 sessions can include a number of sessions $b_i$ where i=1, . . . , K. Then the variable "f" is used for scheduling equally apportioned sessions amongst the class 1 session and is defined as follows: if $((APN-AMBR_1+ \ldots +APN-AMBR_K)<=(a*UE-AMBR))$, then: f=1, $r_i=b_i*UE-AMBR=(f*APN-AMBR_i)/UE-AMBR*UE-AMBR=APN-AMBR_i$ (Class 1 is honored for its APN-AMBR) else if $((APN-AMBR_1+ \ldots +APN-AMBR_K)>(a*UE-AMBR))$, then: $f=a*(UE-AMBR/(APN-AMBR_1+ \ldots +APN-AMBR_K))$. Then ri=bi*UE-AMBR=(F*APN-AMBR$_i$)/UE-AMBR*UE-AMBR=a*(UE-AMBR/APN-AMBR1+ . . . +APN-AMBRk))*APN-AMBRi=(a*APNi/(APN-AMBRk))*UE-AMBR (Fairness is supported). In this case, the aggregate Class 1 traffic rate will be r1+ . . . +rm=(a*UE-AMBR) for no class 2 starvation.

In an exemplary embodiment, for Class 2 session $r_i=b_i*UE-AMBR=(APN-AMBR_i)/(APN-AMBRk+1+ \ldots +APN-AMBRm)*(UE-AMBR-(APN-AMBRk+1+ \ldots +APN-AMBR_M))$ fairness is supported, for scheduler requirements.

In an exemplary embodiment, for Class 1 session "$i$", (i=1, . . . K), select: $b_i=(f*(APN-AMBR_i/UE-AMBR))$, for Class 2 sessions: ("$i=K+1, \ldots, M$"): For Class 2 session "i", select: $b_i=(APN-AMBR_i)/(APN-AMBR_K+1+ \ldots +APN-AMBR_M)*((UE-AMBR-(APN-AMBR_K+1+ \ldots +APN-AMBR_M))/UE-AMBR)$.

In an exemplary embodiment, the QoE for the class 1 sessions can be controlled by the Network Service Assurance/NRT-RIC 210 module. The Network Service Assurance/Near RT RIC 210 module is an intelligent device based on a near-real-time, microservice-based software platform that controls each session for apportionment to enable the QoE for content in an APN-session and to adjust the weights "$b_i$"s, appropriately to meet the QoE for the class 1 sessions, to avoid starvation of class 2 sessions, and to support fairness treatment of the bit-rate for both class 1 and 2 sessions.

Figure 3:
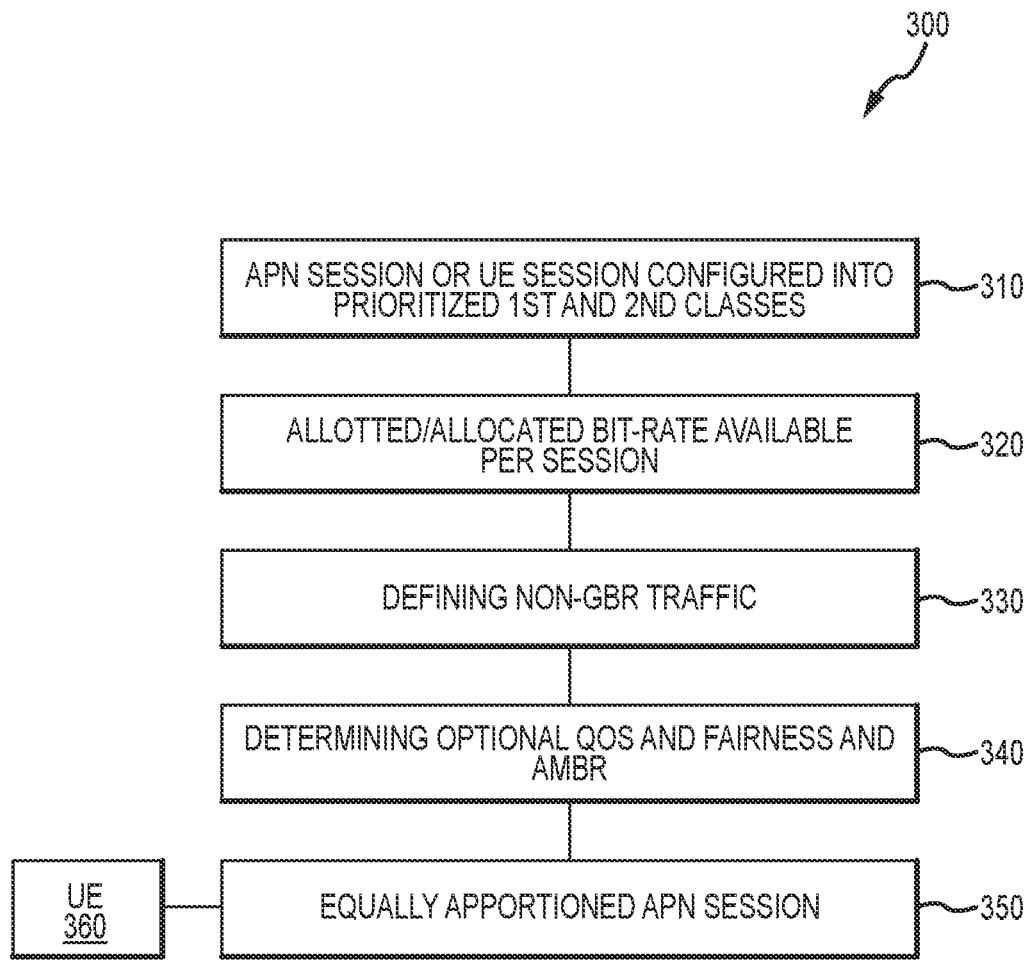
FIG. 3 depicts a block diagram of a high level of managing traffic through User Equipment (UE) to a Protocol Data Unit (PDU) session that supports the optimal Quality of Service (QoS) flow of the session management system in accordance with various embodiments.

In an exemplary embodiment, the first class or second class can each be assigned a session AMBR that is constrained because a session bit rate cannot go beyond its session AMBR. Also, the scheduler assigns a threshold for the aggregate of the first-class traffic for a device. If the total aggregate bit rate of the first-class traffic of the device is below the threshold, then the scheduler assigns the session AMBR to each session of the device and there is no need for proportionality. Else, if the total aggregate bit rate of the first-class traffic of the device is beyond the threshold, then the scheduler proportionally schedules the packets of the first-class traffic of the device to limit the aggregate rate of the first-class traffic of the device below the threshold. The proportionality guarantees fairness among the first-class sessions of the device and refrains starvation of the second class traffic FIG. 3 depicts a block diagram of a high-level managing of traffic through User Equipment (UE) to a Protocol Data Unit (PDU) session that supports the optimal Quality of Service (QoS) flow of the session management system in accordance with various embodiments. A policy profile defines the treatment of session traffic based on traffic priority, and limits or constraints that have been imposed. The management session system 300 includes an architecture at block 310 of a first-class session and a second class session with a corresponding priority rate. At block 320, the available bit rate is allocated by the scheduler with the minimum bit rate that is expected to be available for each of the first and second class sessions. The second class session is given a minimum bit rate to avoid session starvation. At block 330, for each session, the guaranteed bit rate (GBR) defines the minimum that is expected to be available for the PDU session 350.

At block 340, the optimal QoS profile (or an AI model can be configured) is used to configure the APN session for the AMBR allotted for the user equipment (UE) 360 (i.e., the sum of all total bit rates that all non-GBR bearers associated with an access point name (APN)). The AMBR limits the total non-GBR traffic for the APN. The AMBR can be specified independently for uplink and downlink traffic. The UE (User Equipment) 360 (e.g., a smart device) can establish a PDU session 350 via a 5G new radio (gNB) to a Data Network (DN) for traffic exchange. The UE-AMBR combines the maximum bit rate across all non-GBR bearers of a UE and enforces bandwidth allocation by the eNB for both uplink and downlink. The APN-AMBR aggregates the maximum bit rate across all non-GBR bearers and all packet data network (PDN) connections of the same APN and enforces bandwidth allocation by the PDN GW in 4G and UPF in 5G for a downlink. Finally, for each APN access, by a UE, it is associated with per APN Aggregate Maximum Bit Rate (APN-AMBR).

The APN-AMBR is a subscription parameter that limits the aggregate bit rate that can be expected to be provided across all non-GBR bearers and all PDN connections of the same APN (e.g., excess traffic may get discarded by a rate shaping function). Also, each of the non-GBR bearers could potentially utilize the entire APN-AMBR, e.g., when the other non-GBR bearers do not carry any traffic. GBR bearers are outside the scope of APN-AMBR. The scheduler controlled by the service assurance/Near RT RIC module schedules the first class session with a proportional share of an available bit rate constrained by the AMBR available and by a set of attributes ascribed to each first class session of traffic. This scheduling is adjusted based in part on metrics generated by the UE 360 and includes fairness apportioned for each share of the bit rate of each first class session for equal quality of experience between each first-class session.

Figure 4:
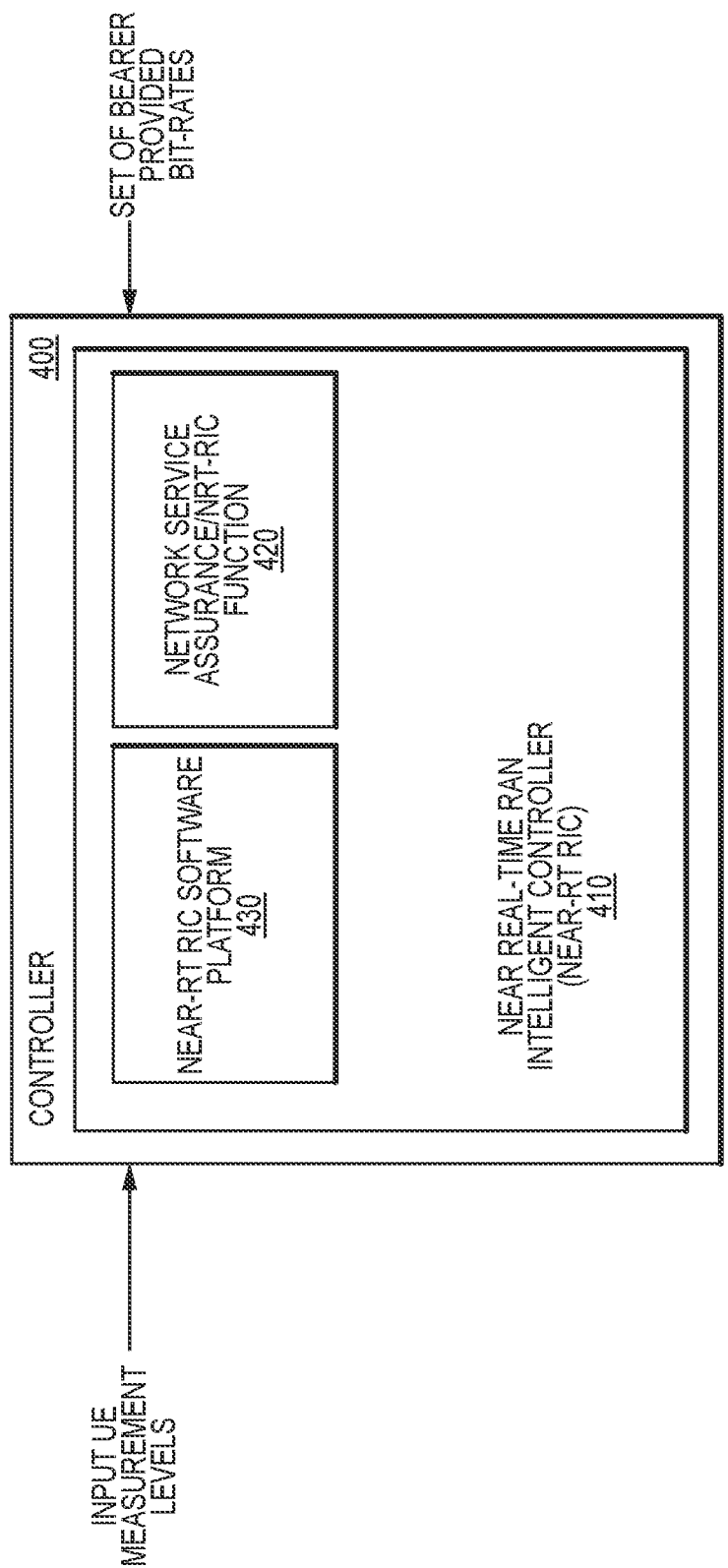
FIG. 4 is an exemplary diagram of a controller for measurement and control for Quality of Experience (QoE) based on multiple measurements in both in RAN and the UE of the session management system in accordance with various embodiments.

FIG. 4 is an exemplary diagram of a controller for measurement and control for Quality of Experience (QoE)

based on multiple measurements in both RAN and in the UE of the managing session system in accordance with various embodiments. The 3GPP specification includes support to allocate bit-rates in multiple session classes as defined by the QCI in 4G and 5QI in 5G for application development. The scheduler allocation application of the scheduler 245 implemented by the intelligent device of the service assurance/near RT RIC module is programmed to all for the support of QoE for New Radio (NR) in a standalone mode that can be implemented by per-slice QoE measurements and control.

In FIG. 4, in an exemplary embodiment, the QoE management is controlled by the controller 400 that includes inputs of multiple simultaneous QoE measurement collection both in RAN, as well as in UE. In conjunction with the 3GPP specification, the service assurance controller 400 supports a set of appropriate applications or AI models that enable configuration, activation, and deactivation procedures for both the signaling-based for use and the management-based QoE measurement collection and reporting. The QoE functions by the controller 400 can be implemented using a Network Service Assurance/NRT-RIC function 420 by a Near Real-Time RAN Intelligent Controller (Near-RT RIC) 410.

In an exemplary embodiment, the Near Real-Time RAN Intelligent Controller (Near-RT RIC) 410 is a near-real-time, microservice-based software platform (i.e., Near-RT RIC software platform 430) for hosting microservice-based applications. The microservice-based applications are executed on the near-RT RIC platform. The near-RT RIC software platform 430 can also provide the apps via a cloud-based infrastructure for controlling a distributed collection of RAN infrastructure (eNB, gNB, CU, DU) in an area.

In an exemplary embodiment, the Near-RT RIC software platform 430 leverages embedded intelligence for per-UE controlled load-balancing, RB management, interference detection, and mitigation. This provides QoS management, connectivity management, and seamless handover control. Deployed as a VNF, a set of VMs, or CNF, it is configured as a scalable platform to onboard third-party control applications. The Near-RT RIC software platform 430 can also leverage a Radio-Network Information Base (R-NIB) database which captures the near real-time state of the underlying network and can also send RAN data to train the AI/ML models that can be implemented for the intelligent service assurance/Near RT RIC module 210 (of FIG. 2), which are then fed to the Near-RT RIC to facilitate radio resource management for the subscriber. The Near-RT RIC interacts with Non-RT RIC via an interface to receive the trained models and execute them to improve the network conditions. The Network Service Assurance/Near RT RIC function 420 enables control of the QoE and adjusts the weights "bi"s, appropriately to meet the treated the allocated session with QoE, to avoid session starvation, and to support session fairness for the appropriate classes treated.

Figure 5:
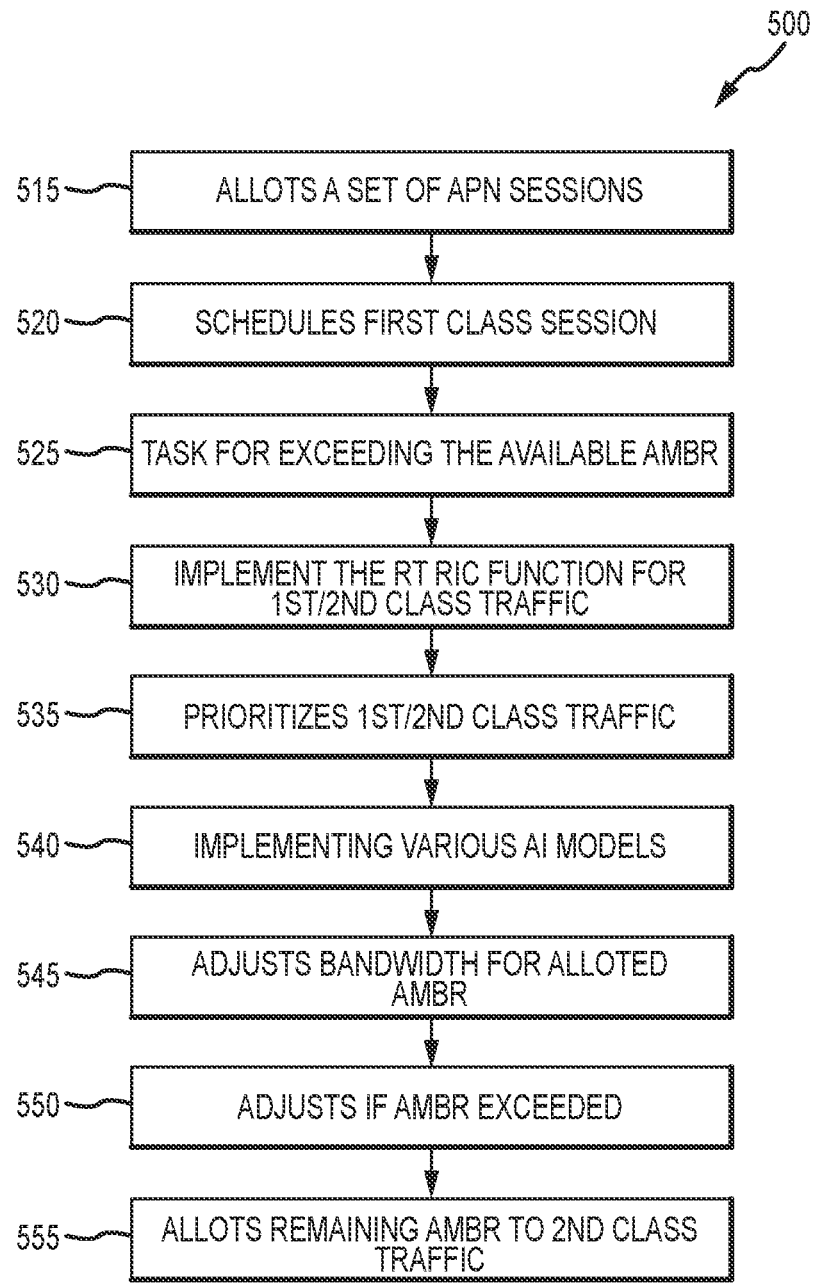
FIG. 5 illustrates an exemplary flowchart for session management of a session management system in accordance with various embodiments.

FIG. 5 illustrates an exemplary flowchart for session management of a management system in accordance with various embodiments. The flowchart 500 depicts at step 510 defining a bit rate for traffic multiple classes of traffic which can be bearer provided to a scheduler for allocation. At step 515, the scheduler is allotted a subscriber-based APN-session that is composed of prioritized traffic, that can include a set of multiple first-class sessions for the subscriber where each subscriber is honored with an amount equal to an aggregate maximum bit rate (AMBR) available or allotted by the APN. At step 520, the scheduler schedules a set of first-class traffic with a proportional share of an available bit rate constrained by allotment of AMBR made available and by a set of attributes ascribed to each first class session of traffic that has been treated with fairness apportioned for each share of the bit rate of each first class session that makes up the total number of first-class sessions. The fairness apportioned for each share ensures an equal quality of experience between each first-class session.

At step 525, in response to the scheduling of a set of first-class sessions, if the sum of each first-class session that is proportional causes the bit rate to exceed the AMBR available, then the scheduler is controlled by the service assurance/Near RT RIC module (i.e., and implementation of intelligent AI models) to reduce by the same percentage each proportional share in each first class session of the available bit rate of session traffic. This reduction is the same percentage of each bit-rate share of each first class session results in an overall reduction of the sum of all first-class session bit rates for the subscriber while maintaining fairness proportioned to each share of the bit rate in each first class session and each first class session is provided with the same quality of service for the subscriber.

In an exemplary embodiment, the service assurance/Near RT RIC module does not have to allocate proportional bit rates in each session as the AI model can independently determine each session's bit rate. In embodiments, the AI model implemented by the assurance service module of any second class sessions for the subscriber by either not allocating bandwidth for the first-class sessions that are above a certain level or a specified percentage of the AMBR allotted by user equipment (UE) or by dynamically adjusting the certain model/threshold in the AI model by the service assurance module for the quality of experience in each session. In embodiments, if a bandwidth required for the aggregate traffic of the first class session is lower than the certain percentage or specified percentage of the bandwidth of the AMBR allotted by the UE, the AI model implemented by the service assurance module can adjust and determine the bit rate for optimal quality of experience in each session. In an embodiment, if the aggregate first class session traffic for a device or subscriber is beyond the certain level or a specified percentage of the bandwidth of the AMBR of the UE, then the assurance module can either dynamically adjusting the certain level or specified percentage of the first class session traffic or allocating proportionally, based on the AI model implemented by the service assurance module, a certain percentage of the bandwidth of the AMBR allotted at the UE to the AMBR allotted at the APN from amongst all the first-class sessions for the device or subscriber.

At step 530, the scheduler is controlled with AI models and by the RT RIC function (i.e., by the service assurance/Near RT RIC module) to implement a bit rate for a second class session that has a priority less than the bit rate of the first class session and can include a residual amount of available bit rate composed of any unused bit rate by the first class session. Also, the bit rate of each second class session is equally proportioned for fairness but not for the quality of service wherein the bit rate for each second class session is further not compromised to an extent to cause starvation in an amount of bitrate transmitted in any second class session.

At step 535, the scheduler prioritizes the first class session, and the second class session in accordance with a network identifier that classifies a data type of the first and second class sessions. For example, QCI in 4G and 5QI in 5G classified real-time video may be given a higher priority because of constraints required to maintain a policy-based quality of experience that is required for the subscriber, or for the particular type of video session that is viewed. At step 540, the scheduler as a result of the policy requirements treats the first class session with a high priority than the second class traffic and also treats each session bit-rate with fairness amongst each of the first-class sessions for an equal quality of experience viewing in the case of a video session. At step 540, the scheduler is controlled by the service assurance/near RT RIC module implementing various AI models and based on inputs of UE levels bit-rate measurements and bear request bit rate measurements, to configure the scheduler operation to prevent any starvation (i.e., bit-rate below a certain amount) for the class 2 session traffic. For example, the scheduler can prevent starvation of any second class sessions for the subscriber by not allocating bandwidth for the first-class sessions that are above a certain level or a specified percentage of the AMBR allotted by the user equipment (UE).

At step 545, the service assurance/near RT RIC module controls (based on AI models) the scheduler based on bandwidth requirements for the aggregate traffic of the first class session. For example, in the case of a lower bandwidth requirement reduced by a certain percentage or specified percentage of the bandwidth of the AMBR allotted by the UE, the scheduler honors the AMBR allotted at the access point network (APN), by adjusting the bit-rates for each of the first-class sessions to meet the overall new reductions required. At step 550, in this case, if the aggregate first class session traffic for the subscriber is beyond the certain level or a specified percentage of the bandwidth of the AMBR of the UE, then the scheduler is controlled to enable the operation to allocate proportionally a certain percentage of the bandwidth of the AMBR allotted at the UE to the AMBR allotted at the APN from amongst all the first-class sessions for the subscriber.

At step 555, if there is any remaining bandwidth that has not been already allocated to either the first or second class sessions, then the scheduler can make further adjustments and allocate the remaining bandwidth to as desired to the second class session and also allocate the bandwidth fairly amongst all second class sessions for the subscriber.

It should be appreciated that the process of FIG. 5 may include any number of additional or alternative tasks, the tasks are shown in FIG. 5 need not be performed in the illustrated order, and the process of FIG. 5 may be incorporated into a more comprehensive procedure or process having additional functionality not described in detail herein. Moreover, one or more of the tasks shown in FIG. 5 may be omitted from an embodiment of the process shown in FIG. 6 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or exemplary embodiments are only examples and are not intended to limit the scope, applicability, or configuration of the disclosure in any way. Rather, the foregoing detailed description will provide those skilled in the art with a convenient road map for implementing the exemplary embodiment or exemplary embodiments.

As described, a session management system includes several data processing components, each of which is patentable, and/or have patentable aspects, or having processing hardware capable of performing automated processes that are patentable. This document is not intended to limit the scope of any claims or inventions in any way, and the various components and aspects of the system described herein may be separately implemented apart from the other aspects.

The invention claimed is:

1. A method of scheduling bit rates for multi-class session traffic of a user device, comprising:
   defining by a scheduler a bit rate for a first class traffic for a first class session with a cellular radio access network, and for a second class traffic for a second class session with the cellular radio access network of a set of multiple first and second class sessions with the cellular radio access network configured for the device, wherein the first class traffic has a first priority and the second class traffic has a second priority, wherein the first priority is higher than the second priority, and wherein the first class sessions and the second class sessions are non-guaranteed bit rate (non-GBR) sessions;
   honoring, by the scheduler, for the device for each first class session, the bit rate equal to a session aggregate maximum bit rate (AMBR);
   assigning, by the scheduler, a threshold for an aggregate bit rate of the first class traffic of the device;
   if a total of the aggregate bit rate of the first class traffic of the device is below the threshold assigned, then assigning by the scheduler for each first class session the session AMBR without proportionality scheduling of the first class traffic; and
   if the total of the aggregate bit rate of the first class traffic of the device is above the threshold assigned, then proportionality scheduling, by the scheduler, packets of the first class traffic for each first class session of the device to limit the total of the aggregate bit rate of the first class traffic of the device below the threshold wherein the proportionality scheduling of the packets of the first class traffic guarantees quality of experience amongst each first class session of the device, and prevents starvation of each second class session of the device, and wherein:
   proportionality scheduling comprises reducing, by a same percentage, a maximum allocated bit rate for each first class session without changing an aggregate maximum bit rate of the user device (UE-AMBR); and
   starvation of each second class session is prevented by determining the threshold assigned as a specific percentage of the (UE-AMBR, wherein the specific percentage is less than one hundred percent.

2. The method of claim 1, wherein each reduced bit rate allocated to each first class session is constrained by the session AMBR and by a set of attributes ascribed to each first class session.

3. The method of claim 1, further comprising:
   allocating, by the scheduler, fairness apportioned for each first class session to ensure equal quality of experience between each first class session.

4. The method of claim 1, wherein the proportionality scheduling comprises:

reducing, by the scheduler, a same percentage of the session AMBR for each first class session so that fairness is maintained for each first class session and each first class session is provided with the same quality of experience for the device wherein the proportionality scheduling guarantees a minimum bandwidth for the second class traffic.

5. The method of claim 4, further comprising:
defining, by the scheduler, the bit rate for the second class session that comprises a residual amount of available bit rate composed of any unused bit rate by the first class session, wherein the bit rate of each second class session is equally proportioned for fairness but not for the quality of experience wherein the bit rate for each second class session is further not compromised by a guarantee of the minimum bandwidth to avoid starvation of second class traffic in each second class session.

6. A system for scheduling bit rates for multi-class session traffic in a network, comprising:
a scheduler unit;
a control unit;
wherein the control unit receives an input of measurements from user equipment, and input from measurements of a series of tunnels of a set of bearers, and implements an intelligent application to configure the scheduler unit to:
define a bit rate for a first class traffic for a first class session with a cellular radio access network, and for a second class traffic for a second class session with the cellular radio access network of a set of multiple first and second class sessions with the cellular radio access network configured for a user device from the network, wherein the first class traffic has a first priority and the second class traffic has a second priority, wherein the first priority is higher than the second priority, and wherein the first class sessions and the second class sessions are non-guaranteed bit rate (non-GBR) sessions;
honor for the device for each first class session, the bit rate equal to a session aggregate maximum bit rate (AMBR);
assign a threshold for an aggregate bit rate of the first class traffic of the device;
if a total of the aggregate bit rate of the first class traffic of the device is below the threshold assigned, then assign for each first class session the session AMBR without proportionality scheduling of the first class traffic; and
if the total aggregate bit rate of the first class traffic of the device is above the threshold assigned, then proportionality schedule packets of the first class traffic for each first class session of the device to limit the total of the aggregate bit rate of the first class traffic of the device below the threshold wherein the proportionality scheduling of the packets of the first class traffic guarantees quality of experience amongst each first class session of the device, and prevents starvation of each second class session of the device, and wherein:
proportionality scheduling comprises reducing, by a same percentage, a maximum allocated bit rate for each first class session without changing an aggregate maximum bit rate of the user device (UE-AMBR); and
starvation of each second class session is prevented by determining the threshold assigned as a specific percentage of the (UE-AMBR, wherein the specific percentage is less than one hundred percent.

7. The system of claim 6, wherein each reduced bit rate allocated to each first class session is constrained by the session AMBR and by a set of attributes ascribed to each first class session.

8. The system of claim 7, further comprising:
the scheduler unit configured to:
treat each first class session with an attribute of fairness for an equal quality of experience amongst each first class session.

9. The system of claim 6, further comprising:
the scheduler configured to:
allocate fairness apportioned for each first class session to ensure equal quality of experience between each first class session.

10. The system of claim 6, wherein the proportionality scheduling comprises:
the scheduler configured to:
reduce a same percentage of the session AMBR for each first class session so that fairness is maintained for each first class session and each first class session is provided with the same quality of experience for the device wherein a proportionality scheduling guarantees a minimum bandwidth for the second class traffic.

11. The system of claim 10, further comprising:
the scheduler unit configured to:
define the bit rate for the second class session that comprises a residual amount of available bit rate composed of any unused bit rate by the first class session, wherein the bit rate of each second class session is equally proportioned for fairness but not for the quality of experience wherein the bit rate for each second class session is further not compromised by a guarantee of the minimum bandwidth to avoid starvation of second class traffic in each second class session.

12. The system of claim 11 wherein the first class session, and the second class session are prioritized in accordance with a network identifier that classifies a data type of the first and second class sessions.

13. A method of providing service assurance for session management, comprising:
defining, by a service assurance module, a bit rate for first class traffic for a first class session with a cellular radio access network, and second class traffic for a second class session with the cellular radio access network of a set of multiple first and second class sessions with the cellular radio access network configured for a user device, wherein the first class traffic has a first priority and the second class traffic has a second priority, wherein the first priority is higher than the second priority, and wherein the first class sessions and the second class sessions are non-guaranteed bit rate (non-GBR) sessions;
honoring by the service assurance module, for each device for each first class session, the bit rate equal to a session aggregate maximum bit rate (AMBR);
assigning, by the service assurance module, a threshold for an aggregate bit rate of the first class traffic of the device to ensure optimal quality of experience between each first class session;
if a total of the aggregate bit rate of the first class traffic of the device is below the threshold assigned, then assigning by the service assurance module for each first class session a determined bit rate for first-class session traffic for the device without proportionality scheduling of session traffic; and if the total of the aggregate bit rate of the first class traffic of the device is above the threshold assigned, then proportionality scheduling, by the service assurance module, packets of the first class traffic for each first class session of the device in a manner to limit the total of the aggregate bit rate of the first class traffic of the device below the threshold wherein the proportionality scheduling of the packets of the first class traffic guarantees an optimal quality of experience amongst the first class sessions of the device, and prevents starvation of each second class session of the device, and wherein proportionality scheduling comprises reducing, by a same percentage, a maximum allocated bit rate for each first class session without changing an aggregate maximum bit rate of the user device (UE-AMBR); and starvation of each second class session is prevented by determining the threshold assigned as a specific percentage of the (UE-AMBR, wherein the specific percentage is less than one hundred percent.

14. The method of claim 13 wherein the first class session, and the second class session are prioritized in accordance with a network identifier that classifies a data type of the first and second class sessions.

15. The method of claim 14, further comprising:
treating, based on an artificial intelligence (AI) model implemented by the service assurance module and based on an attribute for the first class session, the quality of experience amongst each first class session.

16. The method of claim 15, further comprising:
preventing starvation based on the AI model implemented by the assurance service module of each second class session for the device by not allocating bandwidth for each first class session that is above a certain level or a specified percentage determined by the assurance service module.

17. The method of claim 16, further comprising:
if the aggregate first class session traffic for the device is beyond the certain level or a specified percentage of the bandwidth of the AMBR of the device then either dynamically adjusting the certain level or the specified percentage of the first class traffic for each session, by the assurance module, or allocating proportionally, based on the AI model implemented by the service assurance module, a certain percentage of the bandwidth of the AMBR allotted at the device.

18. The method of claim 17, wherein the AI model is configured to dynamically adjust a percentage of the bit rate for each device independent of each other, and further dependent on a network load, deliver optimal quality of experience based at least on a device's profile and service received.

* * * * *